United States Patent [19]

Joseph et al.

[11] Patent Number: 5,710,417
[45] Date of Patent: Jan. 20, 1998

[54] BAR CODE READER FOR READING BOTH ONE DIMENSIONAL AND TWO DIMENSIONAL SYMBOLOGIES WITH PROGRAMMABLE RESOLUTION

[75] Inventors: Eugene Joseph, Port Jefferson Station; Yajun Li, Oakdale; Duanfeng He, Ronkonkoma; Joseph Katz, Stony Brook; Jerome Swartz, Old Field, all of N.Y.

[73] Assignee: Symbol Technologies, Inc., Holtsville, N.Y.

[21] Appl. No.: 463,317

[22] Filed: Jun. 2, 1995

Related U.S. Application Data

[63] Continuation-in-part of Ser. No. 268,913, Jun. 30, 1994, Pat. No. 5,621,203, which is a continuation-in-part of Ser. No. 153,637, Nov. 17, 1993, abandoned, and Ser. No. 66,966, May 25, 1993, abandoned, which is a continuation of Ser. No. 818,731, Jan. 6, 1992, abandoned, which is a continuation of Ser. No. 506,674, Apr. 9, 1990, abandoned, which is a continuation of Ser. No. 260,692, Oct. 21, 1988, Pat. No. 4,933,538.

[51] Int. Cl.[6] ................................................ G06K 7/10
[52] U.S. Cl. ................................................ 235/462; 235/472
[58] Field of Search ................................. 235/462, 472, 235/470, 471, 454, 449, 469; 348/363, 362, 361

[56] References Cited

U.S. PATENT DOCUMENTS

| | | | |
|---|---|---|---|
| 4,136,881 | 1/1979 | Sugiura et al. | 235/437 X |
| 4,721,860 | 1/1988 | Troendle | 235/462 X |
| 4,794,239 | 12/1988 | Allais | 235/462 |
| 4,877,949 | 10/1989 | Danielson et al. | 235/462 |
| 5,047,617 | 9/1991 | Shepard et al. | 235/462 X |
| 5,189,292 | 2/1993 | Batterman et al. | 235/494 |
| 5,235,167 | 8/1993 | Dvorkis et al. | 235/462 |
| 5,280,161 | 1/1994 | Niwa | 235/472 |
| 5,478,997 | 12/1995 | Bridgelall et al. | 235/462 |
| 5,504,316 | 4/1996 | Bridgelall et al. | 235/470 X |

FOREIGN PATENT DOCUMENTS

| | | | |
|---|---|---|---|
| 0093871 | 4/1989 | Japan | 235/462 |
| 0198175 | 8/1991 | Japan | 235/462 |

Primary Examiner—Donald T. Hajec
Assistant Examiner—Thien Minh Le
Attorney, Agent, or Firm—Kirschstein, et al.

[57] ABSTRACT

A plurality of the areas of differing light reflectivity of a bar code symbol or the like are simultaneously illuminated using, for example, a beam of light that has an elongate cross-section. The light beam is swept over the symbol to be read in a direction transverse to the elongated dimension of the illuminated region so that a two-dimensional area of the symbol is illuminated over time. The reflected light is sensed by a 1D CCD array. A microprocessor within the scanner provides visual feedback to aid a user in aligning the device, and also provides for a selectable aspect ratio for the image, a selectable image resolution and size, a selectable aspect ratio of the illumination, and a selectable pixel size. All of these options may be programmed within the microprocessor, enabling the device to read a large variety of two-dimensional symbols.

22 Claims, 4 Drawing Sheets

FIG.1

BAR CODE READER FOR READING BOTH ONE DIMENSIONAL AND TWO DIMENSIONAL SYMBOLOGIES WITH PROGRAMMABLE RESOLUTION

CROSS REFERENCE TO RELATED APPLICATIONS

This application is a continuation-in-part of U.S. Ser. No. 08/268,913, filed Jun. 30, 1994, now U.S. Pat. No. 5,621, 203, which is itself a continuation-in-part of U.S. Ser. No. 08/153,637, now abandoned, filed Nov. 17, 1993 and U.S. Ser. No. 08/066,966, filed May 25, 1993 which was a continuation of U.S. Ser. No. 818,731, filed Jan. 6, 1992, now abandoned, which was a continuation of U.S. Ser. No. 506,674, filed Apr. 9, 1990, now abandoned, which was a continuation of U.S. Ser. No. 260,692, filed Oct. 21, 1988, now U.S. Pat. No. 4,933,538. U.S. patent application Ser. No. 890,374, filed May 26, 1992, now U.S. Pat. No. 5,250, 791, was also a division of U.S. Ser. No. 506,674 now abandoned. All of these related applications are herein incorporated by reference.

BACKGROUND OF THE INVENTION

The present invention relates to readers for reading optical indicia, for example bar code symbols. Typically, bar code symbols are formed from bars or elements that are typically rectangular in shape with a variety of possible widths. The specific arrangement of these elements defines a character according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, groups of elements are concatenated together to form the complete bar code symbol, with each character of the message being represented by its own corresponding group of elements. In some symbologies, unique "start" and "stop" characters are used to indicate where the bar code begins and ends. A number of different bar code symbologies exist. These symbologies include, e.g., UPC/EAN, Code 39, Code 49, Code 128, Codebar, and Interleaved 2 of 5.

In order to increase the amount of data that can be represented, or stored, on a given amount of surface area, several new bar code symbologies have recently been developed. One of these code standards, PDF 417 (developed by the present assignee), uses a "two-dimensional" scheme in which rows of characters are stacked vertically. That is, there are several rows of bar and space patterns, instead of only one row.

Thus, bar codes include not only the traditional rectangularly-shaped bars and spaces, but any forms of symbol in which different portions of the symbol have different light reflecting characteristics.

Bar codes are typically scanned to transform the graphic symbol elements into electrical signals, which are then decoded into characters. A scanning system uses a light source, typically a laser, which is directed to the symbol or bar code by lenses or other optical components. The reader functions by repetitively scanning the light beam in a path or series of paths across the symbol. Scanning systems also include a sensor or photodetector which detects light reflected from the symbol. A portion of the reflected light is detected and converted into an electrical signal, and electronic circuitry or software decodes the electrical signal into a digital representation. The symbol is decoded according to the coding technique used.

For example, in a Universal Product Code (UPC) bar code typical on many supermarket items, the first five digits indicate the manufacturer of the item, and the second five digits indicate the item number, which may be used by a computer to look-up the current price of the item, and to deduct that item from the supermarket's inventory.

A bar code offers several advantages over other data representations. A bar code allows data to be entered into a computer more rapidly. Bar code systems are nearly error-free. Bar code formats are designed with various forms of error-checking built into the code.

In recent years, there have been increasing demands for storing more information in a bar code label. In particular, there is a desire to create a "portable data file" as opposed to the "license plate" nature of conventional bar code symbols.

For example, a typical UPC bar code only contains the manufacturer's code and the item number. The price look-up must be accessed in a database keyed to the item number of the bar code. A two-dimensional bar code, on the other hand, could be used to store all of the relevant information, such as price, the name of the product, manufacturer, weight, inventory data, and expiration date. This would constitute a "portable data file" because the information could be retrieved without having to access a database. While a price look-up database file is conveniently available in a retail environment, this may not be the case in other applications.

Although two-dimensional bar code schemes do not have vertical redundancy, they incorporate other forms of redundancy as well as other advantages, while increasing the density of information storage. For example, Code PDF 417 allows stitching of partial scans, error detection, and error correction.

Our co-pending patent application Ser. No. 08/268,913, mentioned above, describes a particular method and apparatus for reading two-dimensional symbols that have regions of differing light reflectivity (for example two-dimensional bar codes). This reading technique disclosed in that application involves the use of a reader (for example a hand-held bar code reader) having a laser beam which simultaneously illuminates an elongate region of the indicia to be decoded. An optical scanning component sweeps the beam back and forth over the symbol in a direction transverse to the elongated dimension of the illuminated region, so that a two-dimensional area of the indicia is illuminated over time.

Such a device has a number of advantages over conventional flying spot laser bar code readers, or two-dimensional CCD (charge coupled device) readers. Current two-dimensional symbologies, for example PDF 417, Maxicode and DataMatrix, vary greatly in size and density. Since 2D CCD readers have fixed resolution, a high resolution and a consequently high cost device would be needed to read all 2D symbologies. Alternatively, a flying spot laser reader has a very high and variable resolution, but is a serial device and hence is relatively slow in acquiring an image. The device proposed in U.S. Ser. No. 08/268,913, is a hybrid of these two approaches: a moving laser line reader that combines the self illumination and aiming features of the flying spot laser with the light speed, synchronization and low cost of a one dimensional CCD.

SUMMARY OF THE INVENTION

It is an object of the present invention to provide a development of the previously mentioned device which improves the reader's ability to deal with a large variety of 2D symbologies, some of which may be of high resolution and some of which may be of lower resolution.

According to a first aspect of the present invention there is provided an optical reader for reading an indicia having areas of differing light reflectivity, comprising:

(a) a light source arranged to produce an outgoing light beam which, in use, simultaneously illuminates an elongate region of an indicia to be read, the elongate region including a plurality of areas of differing light reflectivity;

(b) an adjustable image-capture portion for directing the light beam onto the indicia and for receiving light reflected from the indicia, the image-capture portion comprising;

(i) an optical scanning element for scanning the beam over the indicia in a direction transverse to the elongated dimension;

(ii) an optical detector for receiving light reflected from the indicia and for producing an output signal representative thereof; and (c) a microprocessor control for adjusting the image-capture portion in dependence on the indicia to be read.

According to a second aspect of the invention there is provided a method of reading an indicia having areas of differing light reflectivity, comprising:

(a) providing an outgoing light beam which simultaneously illuminates an elongate region of an indicia to be read, the elongate region including a plurality of areas of differing light reflectivity;

(b) providing an adjustable image-capture portion for directing the light beam onto the indicia and for receiving light reflected from the indicia, the image-capture portion comprising:

(i) an optical scanning element for scanning the beam over the indicia in a direction transverse to the elongated dimension;

(ii) an optical detector for receiving light reflected from the indicia and for producing an output signal representative thereof;

(c) adjusting the image-capture portion in dependence upon the indicia to be read.

The preferred optical reader provides visual feed back for aiming under diverse lighting conditions, along with the possibility of selecting (programming) the aspect ratio of the image, the image resolution and size, the aspect ratio of the illumination, and the pixel size. These properties both make the reader easy to aim and make it adaptable to most 2D symbologies. In addition, superior performance is achieved on noisy 1D bar codes over conventional CCD readers.

Control over the image aspect ratio is particularly important, for two reasons:

1. It allows the image to be adapted to the symbology resulting in more efficient coverage of the target symbol. For example typical PDF417 symbols have various aspect ratios (usually rectangular) while a square aspect ratio is better for DataMatrix.

2. Current commercially available 1D CCD's have high resolutions (>2000 pixels typically) at reasonable prices. For any given 1D CCD, if the high linear resolution is not needed in a particular application then less pixels can be used for imaging resulting in a faster scan rate and more lines in an image.

Control of the reader is achieved by means of instructions issued from an on-board microprocessor control. The microprocessor may be pre-programmed with a variety of adjustment, allowing the reader to be used in a variety of different situations. For example, the same reader might be used to read several different bar code symbologies, both 1D and 2D. The visual feedback provided to the user in the preferred embodiment also allows the reader to be used in relatively high ambient light conditions.

The invention may be carried into practice in a number of ways and one specific embodiment will now be described by way of example, with reference to the accompanying drawings, in which:

BRIEF DESCRIPTION OF THE DRAWINGS

FIG. 2b is a schematic view, partially in section, illustrating the operation of the elements shown in FIG. 2a;

DETAILED DESCRIPTION OF THE PREFERRED EMBODIMENT

Figure 1:
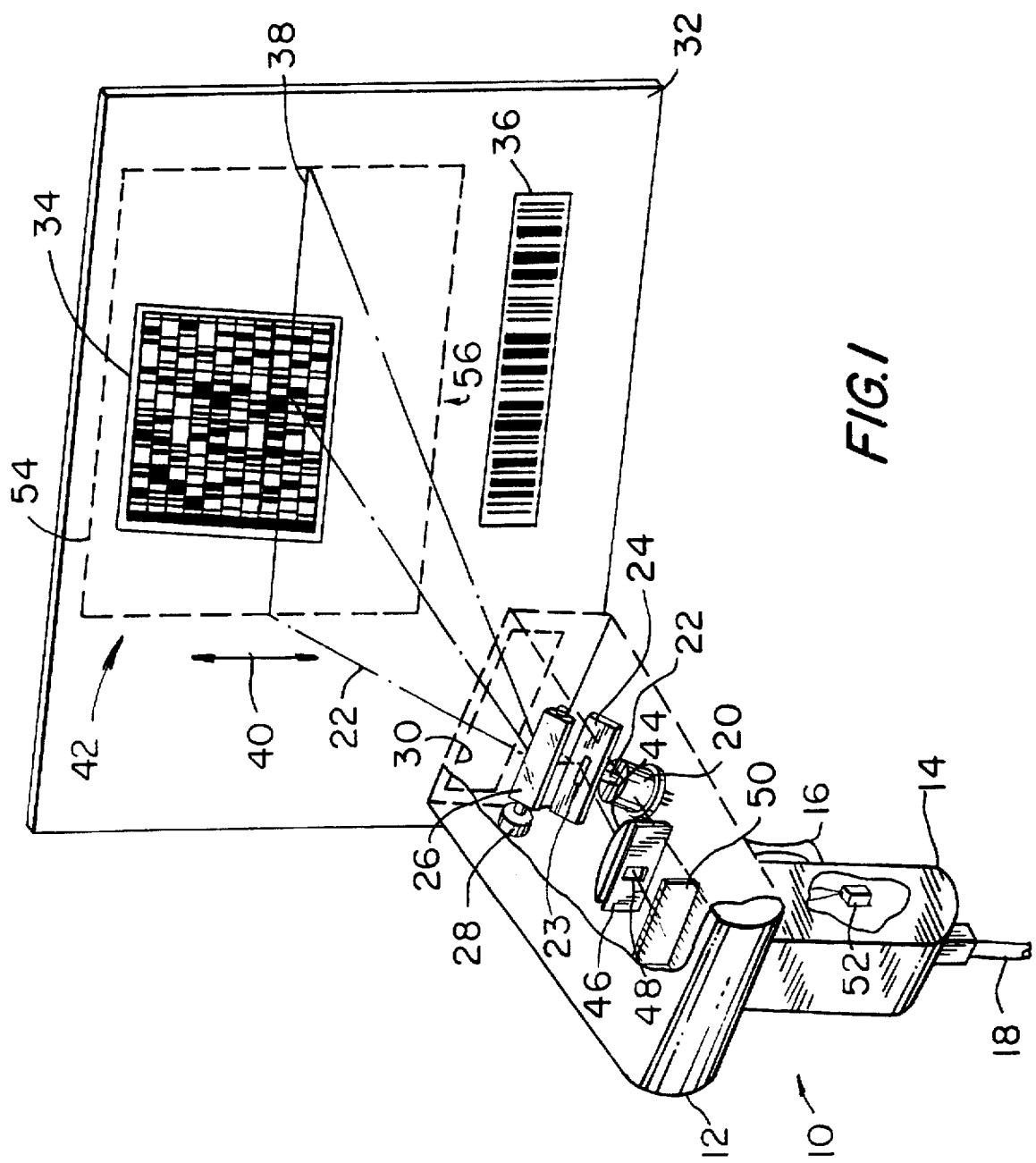
FIG. 1 is a perspective view of a hand-held reader embodying the invention, the reader being shown scanning a two-dimensional bar code and a one-dimensional bar code.

In its preferred form, the optical reader of the present invention for reading an indicia having areas of differing light reflectivity comprises a bar code reader 10 as shown in FIG. 1. The reader 10 comprises a head portion 12 and a manually graspable handle portion 14 having a trigger 16. A cable 18 feeds output signals from the reader to an external data collection device (not shown) such as a computer.

The laser line generator 20 creates a fan-shaped laser beam which passes through an aperture 23 in a fold mirror 24. Alternatively, the beam could be generated by some other source such as a linear array of LED's. The scanning mirror is oscillated by a scan engine or motor 28, which causes the laser beam to be directed out of a window 30 in the front surface of the head 12 to impinge upon a surface 32 which carries an indicia to be read. The indicia to be read may comprise a 2D bar code symbol 34 or a 1D bar code symbol 36. The fan-shaped laser beam 22 strikes the surface 32 in the form of a line 38. As the scan mirror 26 oscillates, this line scans back and forth across the indicia 34 in the directions of the arrows 40. Over time, the line 38 therefore sweeps out an extended two-dimensional area generally indicated at 42.

Light reflected from the target plane 34 is collected by the scanning mirror 26, and is directed to an imaging lens 44 via the fold mirror 24. Behind the imaging lens is an aperture plate 46 having within it an aperture 48. The returning beam passes through the aperture and is detected by a 1D CCD array 50.

The overall operation of the reader is under the control of a programmable microprocessor 52, the microprocessor controls, in particular, the scan engine 28, and thereby the amplitude and frequency of oscillation of the scan mirror 26.

Under normal circumstances, the area 42 swept out by the line 48 will be visible to a user of the device, and it is therefore relatively easy for the user to align the reader properly with the indicia 34 to be read. However, the area swept out may not be easily visible under strong lighting conditions, such as sunlight, and in order to alleviate this the microprocessor 52 controls the scan mirror 26 so that it dwells for longer periods at the top and bottom of its oscillations. The result is that the upper and lower edges of the swept out area 42 are bounded by easily-visible laser lines 54,56. The aiming process, which is entirely intuitive, simply requires that the target be located within the two bright lines.

The brightness of the lines is of course proportional to the dwell time, which is under control of the microprocessor 52. The brightness of the lines can accordingly be adjusted as required, dependent upon the actual or the expected ambient lighting conditions.

The trigger 16 provided on the handle portion 14 may be a multi-position trigger, having a first position and a second position. When the trigger is at the first position the optical reader operates according to preprogrammed criteria such as those discussed above. In the second trigger position one or more of the following parameters can be continuously adjusted under control of the microprocessor 52: the length of or separation between the laser lines 54,56 (the aiming lines) and/or line 38 (the scan line); the brightness of the lines; or the scan rate of the lines. Those parameters can be adjusted by varying the pressure on the trigger when it is in the second trigger position.

It will be understood, of course, that the reader shown in FIG. 1 is capable of reading a large variety of 2D indicia, as well as 1D indicia such as the bar code symbol 36.

Instead of, or in addition to the positions indicated above for a multi-position trigger the trigger may be used to initiate one of three modes of operation according to the trigger position selected, namely: normal flying-spot scanning of a 1D indicia; raster scanning of a 1D or 2D indicia; or generating a fixed scan line 38 and using the CCD array to image the indicia.

Accordingly, the optical reader comprises a programmable hybrid scanner in which various parameters of the scan line pattern are controlled or specified under microprocessor control. For example, the trigger can be used to control or specify certain operational features, dependent on which of a plurality of trigger positions it occupies, or dependent on varying pressure applied to the trigger.

Figure 2A:
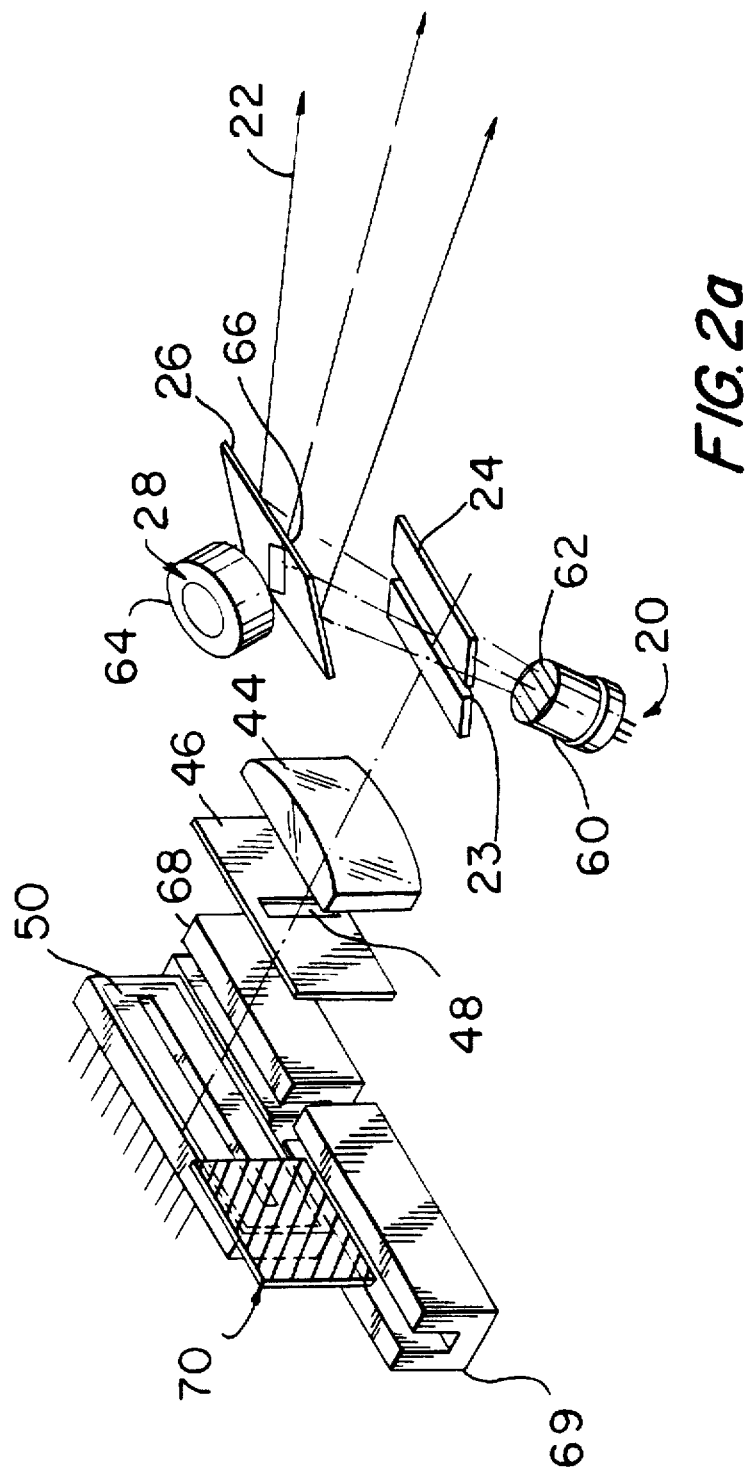
FIG. 2a is a detailed perspective view of the image collection optics of the reader of FIG. 1.

FIG. 2a shows the opto-mechanical systems and sub-systems in rather more detail. As will be seen, the laser line generator 20 comprises a diode laser collimator unit 60, in front of which is positioned a holographic light shaping diffuser 62. The flat laser beam 22 is scanned by the scanning mirror 26, the scan engine 28 of which includes a driving coil 64 and a permanent magnet 66. The 1D CCD array 50 is movable in a direction parallel to its length within a guide channel 68. Adjacent to that guide channel there is a further guide channel 69 within which there is a movable shutter blade or adjustable field stop 70.

Figure 2B:
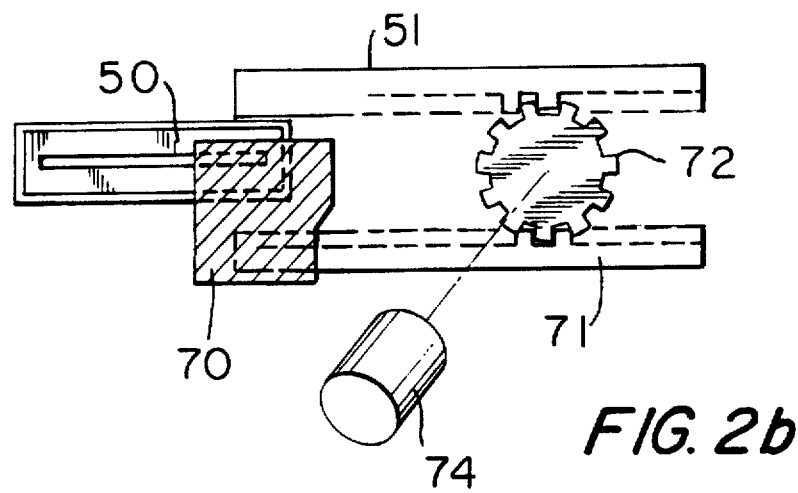

FIG. 2b illustrates in more detail how the 1D CCD array and the field stop move with respect to each other. As may be seen, the CCD array 50 is coupled to a rack 51, and the field stop 70 is coupled to a further parallel rack 71. The racks are mutually movable via an intermediate pinion gear 72, which rotates under control of a servo motor 74. The motor 74 is itself controlled by the microprocessor 52 (FIG. 1).

The purpose of the rack and pinion mechanism 51,71,72 is to control the image width as recorded on the CCD array 50. If, for example, the total length of the CCD array 50 is $y_0$, but only a length y is needed for the image, the servo motor 74 is actuated under microprocessor control to move the CCD in one direction by a distance $(y_0-y)/2$, while the field stop 70 is moved $-(y_0-y)/2$ in the opposite direction. This leaves the length y of the CCD array exposed to the incoming light.

In addition to controlling the width of the image, the height may also be controlled, by the microprocessor, according to the amplitude of oscillation of the scanning mirror 26.

Thus, by combining control of the servo motor 74 with control of the scan engine 28, full control of the image aspect ratio may be achieved.

For a given image aspect ratio, the horizontal resolution is fixed and is determined by the density of pixels on the 1D CCD array. The vertical resolution is controlled by how frequently a line is clocked from the CCD array. This may be increased up to a limit determined by the maximum line rate of the CCD array. Within these resolution ranges, the image size can be varied greatly. However, image size may be severely restricted if the application is a hand-held one, due to the phenomenon known as hand jitter.

Using a conservative model for hand jitter, one can investigate the maximum practical image size. We assume, to begin with, that we have a reader such as that shown in FIG. 1, in which:

x—Maximum scan rate of 1D CCD (scans/sec)

f—Frequency of scanning mirror (Hz)

j—Maximum image acquisition time considering hand jitter issues (sec)

Assuming no hand jitter (i.e. the scanner is fixed in a clamp), the number of scans (S) per image frame is given by $$S_{no\_jitter} = x/(2f)$$

If hand jitter is considered (i.e. hand-held device), the number of scans per image becomes:

$$S_{jitter} = x * Min(1/(2f), j)$$

$$Max(S_{jitter}) = xj$$

In practice the maximum number of scans per image is xj and is limited by the speed of the 1D CCD device. This implies that we should use the highest speed 1D CCD device that is available at a reasonable cost. Since these devices also have high resolution (>2000 pixels) it is possible to further increase the scan rate if only a fraction of the pixels is needed. One simply clocks out of the CCD only the pixels needed and immediately resets the device to collect a new scan. For example, let:

n—Number of pixels in 1D CCD device m—Number of pixels needed for an application (m≦n)

The new maximum number of scans per image is given by:

$$Max_{new}(S_{jitter}) = nxj/m$$

The maximum number of pixels (P) per image is:

$$Max_{new}(P_{jitter}) = m * Max_{new}(S_{jitter})$$
$$= nxj$$

The speed-up is accomplished by discarding the last (n−m) pixels from each scan acquired by the 1D CCD. There is a problem in ignoring these (n−m) pixels in current commercial 1D CCD's since their analog shift registers have no reset capability. This will cause consecutive scans to interfere with each other. One possible solution is to ensure that these pixels never receive any incoming light. In other words, the last (n−m) pixels of the CCD may be blanked off by placing an opaque material over them. Although this solution does not eliminate all interaction between subsequent scans, it does reduce it to a point where it is no longer a problem. In the preferred device, the optical blanking is provided by the adjustable field stop 70.

In an alternative arrangement, the field stop 70 could be dispensed with by pre-aligning a plurality of 1D CCD arrays that have been optically blanked by differing amounts.

Figure 3:
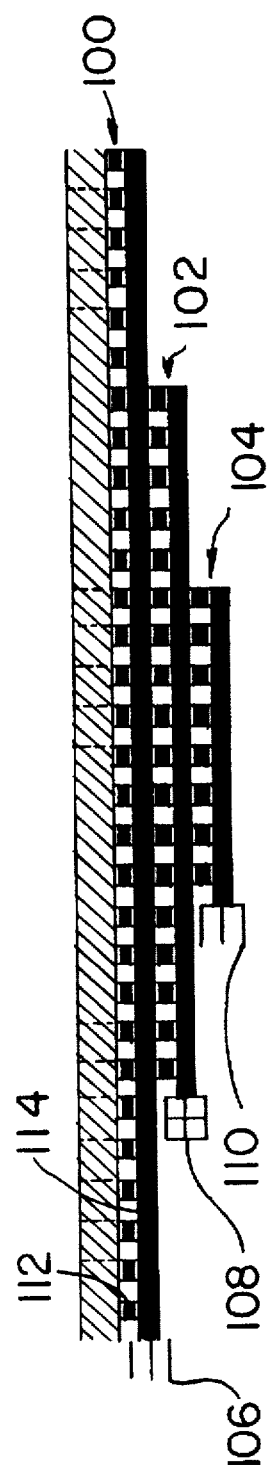
FIG. 3 illustrates a preferred 1D CCD sensor array having multiple analog shift registers.

A further equivalent implementation is to use the arrangement shown in FIG. 3. Instead of aligning several CCD devices, several shift registers 100,102,104 have been aligned on one CCD chip. The operational principle of such a device is as follows. If a complete image is needed, then the first line 100 of horizontal shift-registers is used, and the output is obtained from a first read-out 106. If a smaller centre portion is needed, then the charges are shifted vertically into the second line 102 of horizontal shift registers, and the output is obtained from a second readout 108. Likewise, if an even smaller portion is needed, the horizontal shift registers 104 are used, and readout is obtained at 110. During the vertical shift operations, the unused portions of the horizontal shift registers would automatically dump their charges into the substrate, because when their well-potential is lowered (assuming electrons are being collected and transferred), there are no higher-potential wells nearby to receive the charges. Therefore, such a device solves two problems at once: being able to shift out only a section of the image while resetting the rest, and making this used section the centre section of the imager.

In FIG. 3, the dark squares 112 represent vertical shift registers, and the dark lines 114 horizontal shift registers.

It will be appreciated, of course, that if the arrangement of FIG. 3 is used, the adjustable field stop 70 of FIG. 2b and the rack and pinion mechanism may be dispensed with. The choice of shift registers to be used within FIG. 3 is controlled via the microprocessor 52.

The microprocessor 52 may, in addition, control the aspect ratio of the illuminated area 42, shown in FIG. 1.

Current 1D laser scanners have the property that every point illuminated by the laser is represented in the analog signal generated by the sensor. This is a desirable property for a 1D imager since it forces any illuminated target to be represented in the image. 2D imagers usually have limited resolution and it is also desirable to have as few unused pixels as possible, i.e. every image pixel has been illuminated by the laser light. This one-to-one correspondence between the image and the illuminated target requires control over the aspect ratio of the illumination. The vertical component of this one-to-one correspondence is provided automatically in this embodiment since the same mirror 26 that reflects the laser light also collects the back scattered light from the image. Both the height of the image and the illuminated target is controlled by the microprocessor via the scanning mirror 26 as shown in FIG. 2a.

Figure 2C:
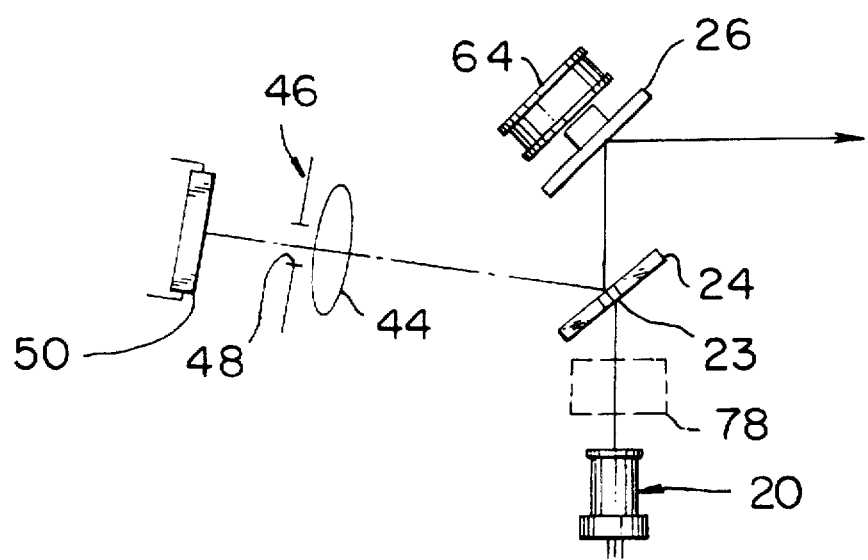
FIG. 2c shows the illumination optics.

Horizontally, the correspondence is enforced by the use of an auto-iris 78, shown in FIG. 2c, whose aperture can be controlled by the microprocessor 52. The mapping between the auto iris's aperture and the CCD position is in general non-linear, and is precalculated and stored in a table in the microprocessor memory. This allows the illuminations aspect ratio to be programmable, and to correspond exactly with the image seen by the CCD array.

The microprocessor 52 may also be used to achieve a programmable pixel size. The conventional approach to a moving laser line camera is to make the scanning rate (integration time) of the 1D CCD much faster than that of the scanning mirror so that the CCD only sees one line of the image at a time. However if we speed up the mirror (i.e. increase oscillation frequency), then several lines can be imaged onto the CCD within one integration period. The overall effect with respect to the camera is to make the pixels appear as if they are very tall and can see several lines simultaneously.

Instead of controlling the scanning mirror 26 the microprocessor could instead achieve the same effect by slowing down the clock frequency of the CCD array 50, although this latter approach may be limited by the saturation effect of the array. Another method would be to use signal processing software to remove noise from the image. Scan averaging or other types of image reconstruction algorithms may be useful for that purpose.

It will be understood from the foregoing description that the microprocessor 52 undertakes several separate and individual control functions in the preferred embodiment, namely:

(a) providing the aiming lines 54,56 which provide visual feedback to the user;

(b) controlling the aspect ratio of the image;

(c) controlling the image resolution and size;

(d) controlling the aspect ratio of the illumination;

(e) controlling the pixel size.

It will be understood that each of the features described above, or two or more together, may find a useful application in other types of optical scanners and bar code readers differing from the types specifically described.

We claim:

1. An optical reader for reading an indicia having areas of differing light reflectivity, comprising:

(a) a light source arranged to produce an outgoing light beam which, in use, simultaneously illuminates an elongate region of an indicia to be read, the elongate region including a plurality of areas of differing light reflectivity;

(b) an adjustable image-capture portion for directing the light beam onto the indicia and for receiving light reflected from the indicia, the image-capture portion comprising (i) an optical scanning element for scanning the beam in a scan pattern over the indicia in a direction transverse to the elongate region;

(ii) an optical detector for receiving light reflected from the indicia and for producing an output signal representative thereof; and (c) a microprocessor control for adjusting at least one of the size and resolution of the scan pattern in dependence on the indicia to be read.

2. An optical reader as claimed in claim 1 in which the microprocessor control controls the optical scanning element to cause the beam to dwell at opposing ends of the scan pattern, thereby producing brighter bars at said opposing ends to assist a user in aligning the reader with respect to an indicium to be read.

3. An optical reader as claimed in claim 1 in which the optical scanning element includes a scan mirror, arranged to reflect the outgoing beam, the mirror being arranged to oscillate under the microprocessor control.

4. An optical reader as claimed in claim 3 in which the scan mirror also receives the reflected light from the indicia being read, and directs the reflected light to the detector.

5. An optical reader as claimed in claim 1 in which the optical detector is a one dimensional, charge-coupled device array.

6. An optical reader as claimed in claim 1 in which the optical detector is a plurality of one dimensional, charge-coupled device arrays, one of said plurality of arrays being chosen for the detector by the microprocessor control.

7. An optical reader as claimed in claim 1 including an adjustable field stop, movable under the microprocessor control with respect to the detector, to restrict the reflected light which impinges on the detector.

8. An optical reader as claimed in claim 7 in which the detector and the field stop are both movable under the microprocessor control.

9. An optical reader as claimed in claim 8 in which the detector and the field stop are movable in mutually opposite directions via a rack and pinion mechanism.

10. An optical reader as claimed in claim 1 in which the optical detector is a charge-coupled device array comprising a plurality of shift register lines, one of said plurality of lines being chosen for readout by the microprocessor control.

11. An optical reader as claimed in claim 10 in which the shift register lines are centered about an axis perpendicular to the elongation of the illuminated region.

12. An optical reader as claimed in claim 1 in which the optical detector is a charge-coupled device array having selectively resettable shift registers, at least some registers being reset under the microprocessor control without being read out.

13. An optical reader as claimed in claim 1 including an auto-iris in the outgoing beam, under the microprocessor control, to control the length of the elongate region on the indicia to be read.

14. An optical reader as claimed in claim 13 in which the optical scanning element includes a scan mirror, arranged to reflect the outgoing beam, the mirror being arranged to oscillate under the microprocessor control.

15. An optical reader as claimed in claim 13 in which the microprocessor control includes a stored data table representative of a relationship between an aperture of the auto-iris and a position of the detector.

16. An optical reader as claimed in claim 3 in which the microprocessor control instructs the scan mirror to oscillate at a rate faster than a readout rate of the detector.

17. An optical reader as claimed in claim 16 in which the detector is under the microprocessor control, the microprocessor control instructing the detector to operate at a reduced clock speed.

18. An optical reader as claimed in claim 1 further comprising a multi-position trigger shiftable between a plurality of positions each position corresponding to a different mode of operation of the optical reader.

19. An optical reader as claimed in claim 1 further comprising a trigger adapted to vary parameters of operation of the reader dependent on the pressure applied to the trigger.

20. A method of reading an indicia having areas of differing light reflectivity, comprising the steps of:

(a) providing an outgoing light beam which simultaneously illuminates an elongate region of an indicia to be read, the elongate region including a plurality of areas of differing light reflectivity;

(b) providing an adjustable image-capture portion for directing the light beam onto the indicia and for receiving light reflected from the indicia, the image-capture portion comprising:

(i) an optical scanning element for scanning the beam in a scan pattern over the indicia in a direction transverse to the elongate region;

(ii) an optical detector for receiving light reflected from the indicia and for producing an output signal representative thereof; and (c) adjusting at least one of the size and resolution of the scan pattern in dependence upon the indicia to be read.

21. An optical reader as claimed in claim 1 in which the microprocessor control controls at least one of the image aspect ratio, the image resolution, the image size, the illumination aspect ratio and the pixel size of the scan pattern.

22. A method as claimed in claim 20 in which the adjusting step is performed by controlling at least one of the image aspect ratio, the image resolution, the image size, the illumination aspect ratio and the pixel size of the scan pattern.

* * * * *